Oct. 27, 1959  G. M. FLYNN  2,910,030
CAN BODY SIDE SEAM SOLDERING AND WIPING MACHINE
Filed Nov. 22, 1955  3 Sheets-Sheet 1
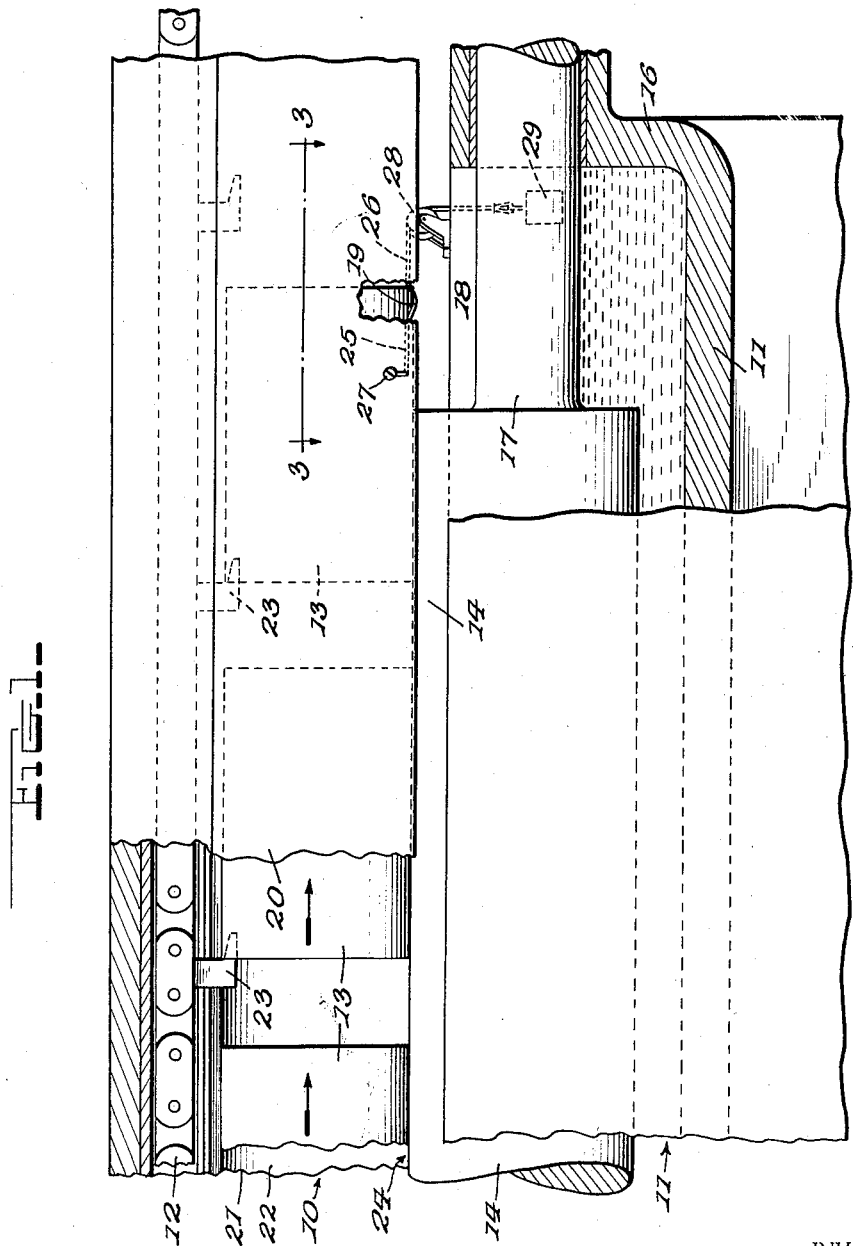
INVENTOR
G.M.Flynn
BY
Mason, Porter, Diller & Stewart
ATTORNEYS

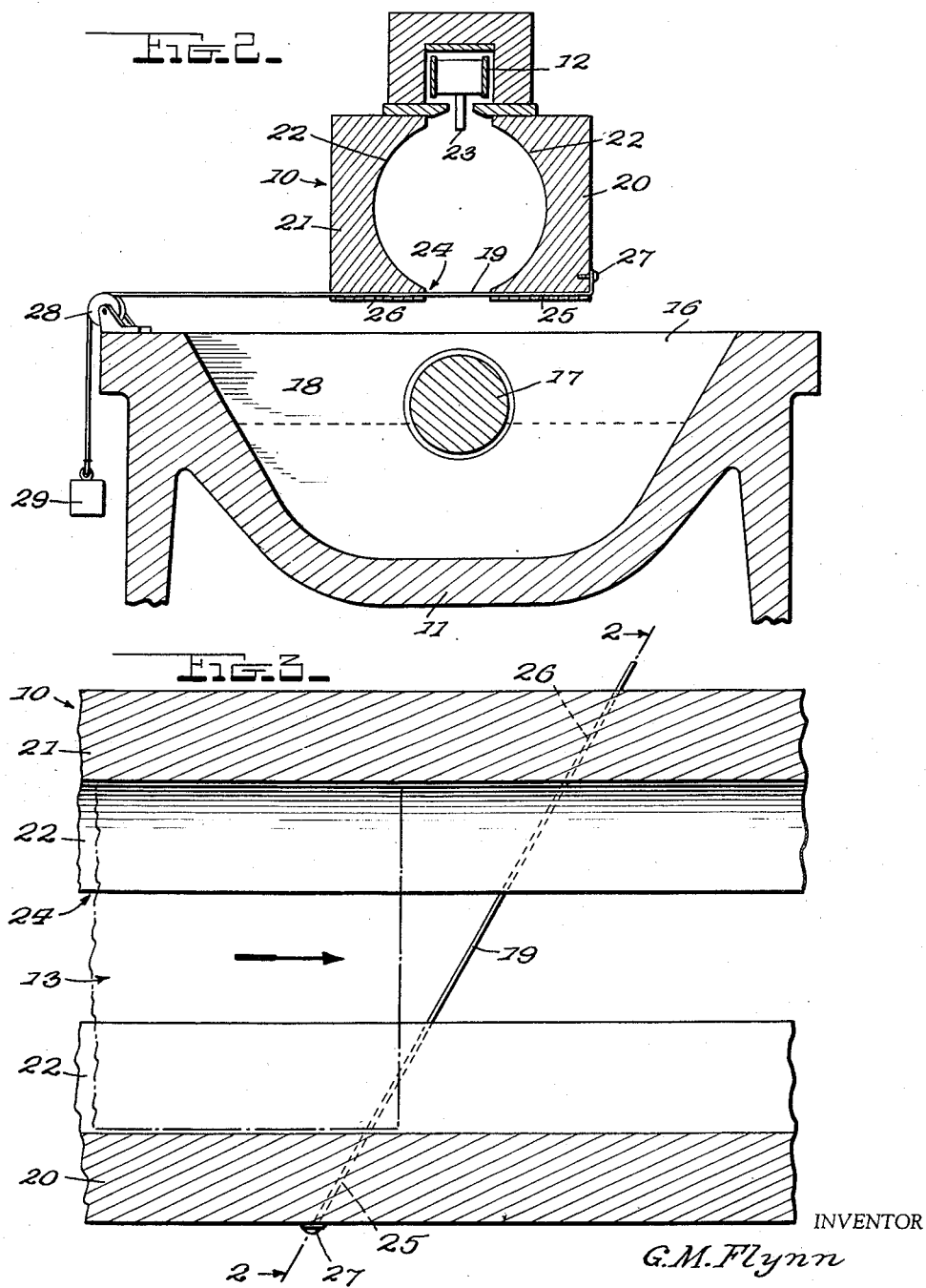

Oct. 27, 1959                G. M. FLYNN                2,910,030
CAN BODY SIDE SEAM SOLDERING AND WIPING MACHINE
Filed Nov. 22, 1955                                3 Sheets-Sheet 3
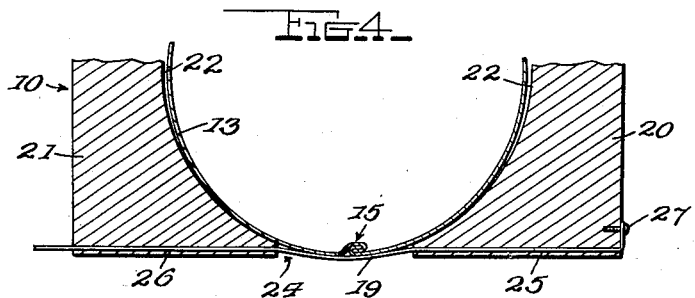
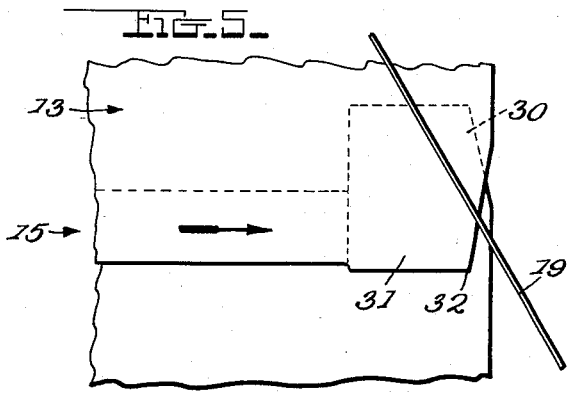
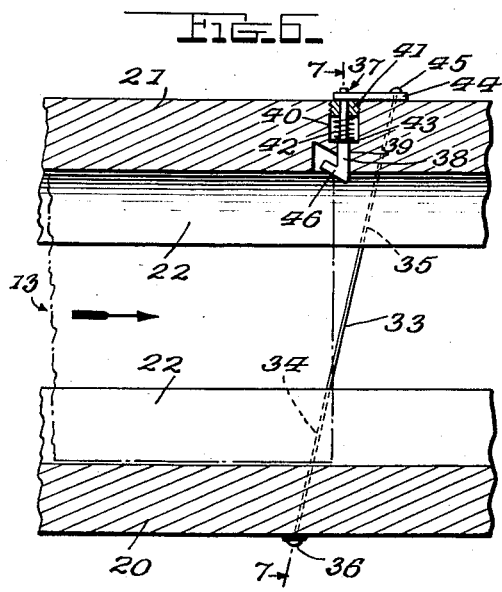
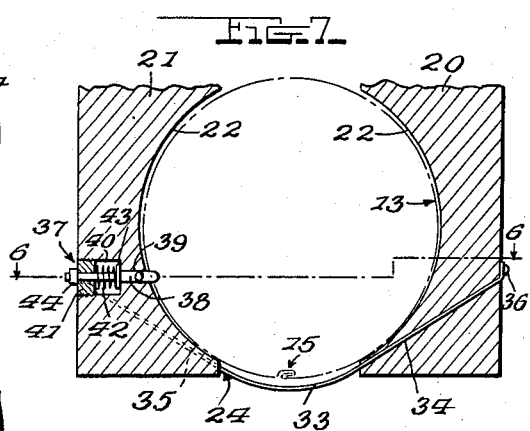
INVENTOR
G. M. Flynn
BY Mason, Porter, Diller & Stewart
ATTORNEYS

United States Patent Office 2,910,030
Patented Oct. 27, 1959

2,910,030

CAN BODY SIDE SEAM SOLDERING AND WIPING MACHINE

George M. Flynn, Oak Park, Ill., assignor to Continental Can Company, Inc., New York, N.Y., a corporation of New York Application November 22, 1955, Serial No. 548,513

5 Claims. (Cl. 113—97)

In the manufacture of metal can bodies having soldered side seams, molten solder is applied by a solder roll to the lock and lap portions of each side seam as the can bodies are progressively advanced along a soldering horn, and surplus solder is wiped off as the bodies continue along the horn. Conventional wiping means have been embodied in the form of rotary wiper rolls or fixed scrapers or wipers and have long had known shortcomings. A rotary wiper roll not only throws solder pellets into the can bodies but cannot uniformly wipe the solder stripe because of the fact that the seam zones of the can bodies become longitudinally bowed by the heat to which they are subjected. Fixed scrapers or wipers have the same faults and in addition their surfaces become oxidized, causing retention of solder and oxide masses. Particles of such masses are scooped up by the oncoming can bodies and a very undesirable condition thus exists. For such reasons, conventional wiping means have been used, not because of desirability or efficiency but because of the lack of more perfect wiping means. The present invention aims to correct this deficiency.

One feature of the invention aims to overcome prior difficulties by a novel association of a surplus solder removing wire with a soldering horn of the type having two elongated longitudinally channeled side members between which the can bodies are conveyed. These horn side members are spaced apart at their lower edges as usual and the freshly soldered side seams travel in this space out of contact with said horn side members. The transverse wire obliquely spans this space and is supported by the horn side members. This wire yieldably engages the seam zones of the can bodies, regardless of any bowing or other irregularities in said zones, and effectively wipes off the surplus solder, and the wiped off surplus runs by gravity from the wire as fast as it is removed from the can bodies.

Another object is to provide a novel construction in which the transverse wire extends obliquely under slight tension across the space between the lower edges of the horn side members and in such position that the exposed corners of the outer lap portions of the can body side seams cannot catch upon said wire as the bodies depress and advance over said wire.

A further object is to provide a novel construction in which the oblique transverse wire is anchored at one of its ends to one of the horn side members, the other of these side members being provided with a guide through which the wire extends to wire tensioning means.

A still further object is to provide another form of the invention in which the transverse wire automatically becomes slack as each can body leaves it but is automatically tensioned to operativeness as soon as the leading end of the seam zone of the next can body arrives over it.

Another object is to provide novel means actuated by the advancing can bodies for operatively tensioning the transverse wire as each can body arrives and for maintaining this tension until the wiping operation has been completed upon said body.

Another feature of the invention aims to so modify the solder roll and so position a surplus solder removing wire that the solder surplus wiped from the can bodies will immediately fall into the usual solder pot in which said roll is operable, thereby continuously reclaiming the wiped off solder.

With the above and other objects in view that will hereinafter appear, the nature of the invention will be more clearly understood by reference to the following detailed description, the appended claims and the several views illustrated in the accompanying drawings.

In the drawings:

Figure 1 of the accompanying drawings is a fragmentary side elevation, partly in section, showing a portion of a soldering machine improved in accordance with the invention.

Figure 2 is a vertical transverse sectional view on an oblique plane indicated by line 2—2 of Figure 3, the wiping wire being in the position which it occupies when not engaging a can body.

Figure 3 is an enlarged horizontal sectional view on line 3—3 of Figure 1.

Figure 4 is an enlarged sectional view similar to a portion of Figure 2 but showing a can body engaged with the wiping wire.

Figure 5 is an inverted view illustrating a portion of a can body and a portion of the wiping wire and showing that the exposed corner of the outer lap portion of the body side seam cannot catch upon said wire as the body advances.

Figure 6 is a fragmentary horizontal sectional view showing a form of construction in which the wiping wire is alternately tensioned and freed of tension.

Figure 7 is a fragmentary transverse section on line 7—7 of Figure 6.

In Figures 1 and 2, a soldering horn 10 is shown extending longitudinally over a solder pot 11. A conventional drag chain 12 is associated with the upper side of the horn 10 for progressively advancing can bodies 13 within the horn 10, and a solder roll 14 is mounted in the pot 11 for applying solder to the body side seam zones. An adequate amount of the applied solder finds its way into the body side seams 15 as usual, and the surplus is removed as hereinafter explained.

Ordinarily, the solder applying periphery of the roll 14 extends to the rear end wall 16 of the solder pot 11. According to the present invention, however, the roll is reduced in diameter at its rear end as shown at 17, thereby terminating its solder applying surface in forwardly spaced relation with the end wall 16, making room for mounting excess solder wiping means and making the rear end portion 18 of the solder pot 11 available for directly receiving surplus solder as it is wiped from the seam zones of the advancing can bodies 13.

A transverse wiping wire 19 is shown supported by the horn 10 and disposed directly over the rear end portion 18 of the solder pot 11 for wiping excess solder from the can bodies. This wire is preferably of about .008" in diameter. The wiped off solder runs from the wire 19 as fast as it is removed from the can bodies and it immediately enters the rear end portion 18 of the solder pot 11. Thus, reclaiming of all wiped off solder is continuously effected as long as the machine is in operation.

While a single, simply mounted and tensioned wiping wire has been shown for illustrative purposes, any other adequate wire type wiping means could of course be employed without disturbing the novel relation of the wiping means with the horn 10 the reduced solder roll end 17 and the rear end portion 18 of the solder pot 11. Moreover, insofar as this relation is concerned, the horn 10 need not necessarily be of the type shown, although wire-type wiping means may be much more advantageously associated with a horn of this type than with another conventional type of horn having widely spaced longitudinal rods for guiding the can bodies.

The horn 10 shown in the drawings embodies two parallel longitudinal side members 20 and 21 each having a longitudinal channel 22 in its inner side for guiding the can bodies. The side members 20, 21 are spaced apart at their upper edges to accommodate the feed dogs 23 of the chain 12; and the lower edges of said side members are spaced apart to form a relatively long and narrow slot 24 through which the seam zones of the can bodies are accessible to the solder roll 14.

In the form of construction shown in Figures 1 to 4, the lower edge portions of the horn side members 20, 21 are formed with wire-positioning passages 25 and 26 respectively, said passages being aligned obliquely of the horn 10. At their outer ends, these passages 25, 26 open through the outer sides of the horn side members 20, 21, and at their inner ends said passages open into the slot 24. The wiping wire 19 extends through the bores 25, 26 and obliquely spans the slot 24. One end of this wire 19 is anchored at 27 to the horn side member 20 and the other end of said wire 19 extends laterally beyond the side member 21 and is connected to wire tensioning means. The wire is shown passing over and depending from a guide sheave 28 and secured to a weight 29.

The weight 29 places sufficient tension on the wire 19 to pull it straight across the slot 24 (Figure 2) when there is no can body passing over the slot spanning portion of said wire. When a can body encounters the wire, however, it cams the latter down to the curved wiping position of Figure 4 and in this position the wire wipes surplus solder from the seam zone of the can body as this body progresses over the wire. During depression of the wire to the operative position of Figure 4, the weight 29 is of course raised somewhat by the pull of the wire. This weight acts to place uniform tension on the wire to cause it to properly follow any inaccuracies in the seam zone of the can body, even if the seam side of the latter be badly bowed due to the heat to which it is subjected.

In Figure 5, a portion of a can body 13 is shown moving across the oblique wiping wire 19. The conventional side seam 15 includes inner and outer lap portions 30 and 31 and the latter has the usual exposed corner 32. The obliquity of the wire 19, however, is in such a direction as to prevent said wire from catching on the corner 32 as the leading end of the can body engages the wire.

In Figures 6 and 7, the wiping wire 33 obliquely spans the slot 24 and extends through passages 34 and 35 in the horn side members 20 and 21, respectively. These passages 34, 35 incline from the edges of the slot 24 to the outer sides of the side members 20 and 21, respectively, and the end of the wire which extends through the passage 34 is anchored at 36 to the side member 20. The other end of the wire is connected to a wire tensioning and releasing means 37 which alternately causes movement of the wire to and from wiping position. The wire remains in wiping position sufficiently long to wipe one can body, then lowers until the next can body starts over the wire, then again rises to wiping position and so on.

The means 37 includes a short rod 38 which is slidable in a guide opening 39 formed transversely through the horn side member 21. The outer end portion of the opening is counterbored at 40 and the outer end of this counterbore is closed by an apertured plug 41 through which the rod 38 extends. A coiled spring 42 is disposed in the counterbore 40 and at one end abuts the plug 41. The other end of this spring abuts a collar 43 on the rod 38 and thrusts inwardly on the latter. The outer end of the rod 38 is provided with an arm 44 to which the end of the wire 33 remote from the anchorage 36 is secured at 45. The inner end of the rod 38 is provided with an actuating cam 46 cooperable with the can bodies 13 as explained below.

When no can body is in wiping engagement with the wire 33, the spring 42 holds the rod 38 in its innermost position as in Figures 6 and 7. At this time, the wire 33 is slack and hangs slightly below the path of the approaching can body (Figure 7) and the cam 46 is in the path of this body. The approaching can body 13 starts over the slack wire 33 without touching the latter but by the time the wiping operation should start, the can body has operated the cam 46, thereby sliding the rod 38 outwardly, consequently raising the wire to operative position, and holding this wire under sufficient tension to perform the wiping operation. As the wiped can body leaves the cam 46, the spring 42 moves the rod 38 inwardly, thereby again placing slack in the wire 33. As the approaching can body does not have to cam the wiping wire downwardly from a normally taut position to a curved body underlying position, as in Figures 1 to 4, the wire need be only slightly oblique to the line of travel of the can bodies.

In each form of the invention, the wiping wire performs its function without throwing any solder into the can bodies. Moreover, as the wiped off solder falls from the wiping wire as fast as it is wiped from the can bodies, there is no retention of solder and oxide on the wire. When any form of the wiping means is mounted over the rear end portion of the solder pot and the reduced rear end of the solder roll, the wiped off solder falls into said pot and is continuously reclaimed. However, it will be clear that the wiping wire could be employed at some other location, if desired.

From the foregoing it will be seen that novel and advantageous provision has been disclosed for attaining the desired ends.

While example disclosures of the wiper wire arrangements are made herein it is to be understood that variations in the disclosed arrangements may be made within the spirit and scope of the invention as defined in the appended claims.

I claim:

1. In a can body side seam soldering machine, a horn along which freshly soldered can bodies are progressively advanced with their side seam zones disposed downwardly, a solder wiping wire extending obliquely under said horn for wiping excess solder from the seam zones of the advancing can bodies, and means connected with said wire and including a part engageable and displaceable by passing cans for alternately lowering said wire to a position below the can body path and raising said wire to an operative position, the lowering of said wire occurring at the end of each wiping operation, the raising of the wire occurring as the next can body seam zone starts over said wire.

2. In a can body side seam soldering machine, a horn provided with two opposed longitudinally channeled side members between which freshly soldered can bodies are progressively advanced, the lower edges of said side members being spaced apart to provide a relatively long and narrow slot in which the seam zones of the can bodies travel, a wiping wire obliquely spanning said slot for wiping excess solder from said seam zones of the advancing can bodies, and means connected with said wire and including a part engageable and displaceable by passing cans for alternately lowering said wire to a position below the can body path and raising said wire to an operative position, the lowering of said wire occurring at the end of each wiping operation, the raising of said wire occurring as the next can body seam zone starts over said wire.

3. In a can body side seam soldering machine, a horn along which freshly soldered can bodies are progressively advanced with their side seam zones disposed downwardly, a solder wiping wire extending obliquely under said horn for wiping excess solder from the seam zones of the advancing can bodies, and means connected with said wire for alternately lowering said wire to a position below the can body path and raising said wire to an operative position, the lowering of said wire occurring at the end of each wiping operation, the raising of the wire occurring as the next can body seam zone starts over said wire, said wire lowering and raising means including an actuating element projecting into the path of the advancing can bodies and actuated by the latter.

4. In a can body side seam soldering machine, a horn provided with two opposed longitudinally channeled side members between which freshly soldered can bodies are progressively advanced, the lower edges of said side members being spaced apart to provide a relatively long and narrow slot in which the seam zones of the can bodies travel, a wiping wire obliquely spanning said slot for wiping excess solder from said seam zones of the advancing can bodies, and means connected with said wire for alternately lowering said wire to a position below the can body path and raising said wire to an operative position, the lowering of said wire occurring at the end of each wiping operation, the raising of said wire occurring as the next can body seam zone starts over said wire, one end of said wire being anchored to one of said side members, said wire lowering and raising means comprising a movable member mounted on the other of said side members and connected to the other end of said wire, the line of movement of said movable member being transverse to said horn to cause tensioning of said wire when said movable member is moved in one direction and loosening of said wire when said movable member is moved in the other direction, means biasing said movable member in said other direction, and an actuating element connected with said movable member for moving it in said one direction, said actuating element projecting into the path of the advancing can bodies and being actuated by the latter.

5. In a can body side seam soldering machine, a horn along which freshly soldered can bodies are progressively advanced with their side seam zones disposed downwardly, a solder wiping wire extending obliquely under said horn for wiping excess solder from the seam zones of the advancing can bodies, and means operable each time a can body reaches the position of said wire to raise the wire into can body engaging position and operable as each can body is leaving contact with the wire to lower said wire away from said can body engaging position.

References Cited in the file of this patent

UNITED STATES PATENTS

| | | |
|---|---|---|
| 2,406,159 | O'Neil | Aug. 20, 1946 |
| 2,432,788 | O'Brien et al. | Dec. 16, 1947 |
| 2,553,547 | Brown et al. | May 22, 1951 |